June 7, 1949. O. L. SNYDER 2,472,686
CASTER
Filed Nov. 17, 1943
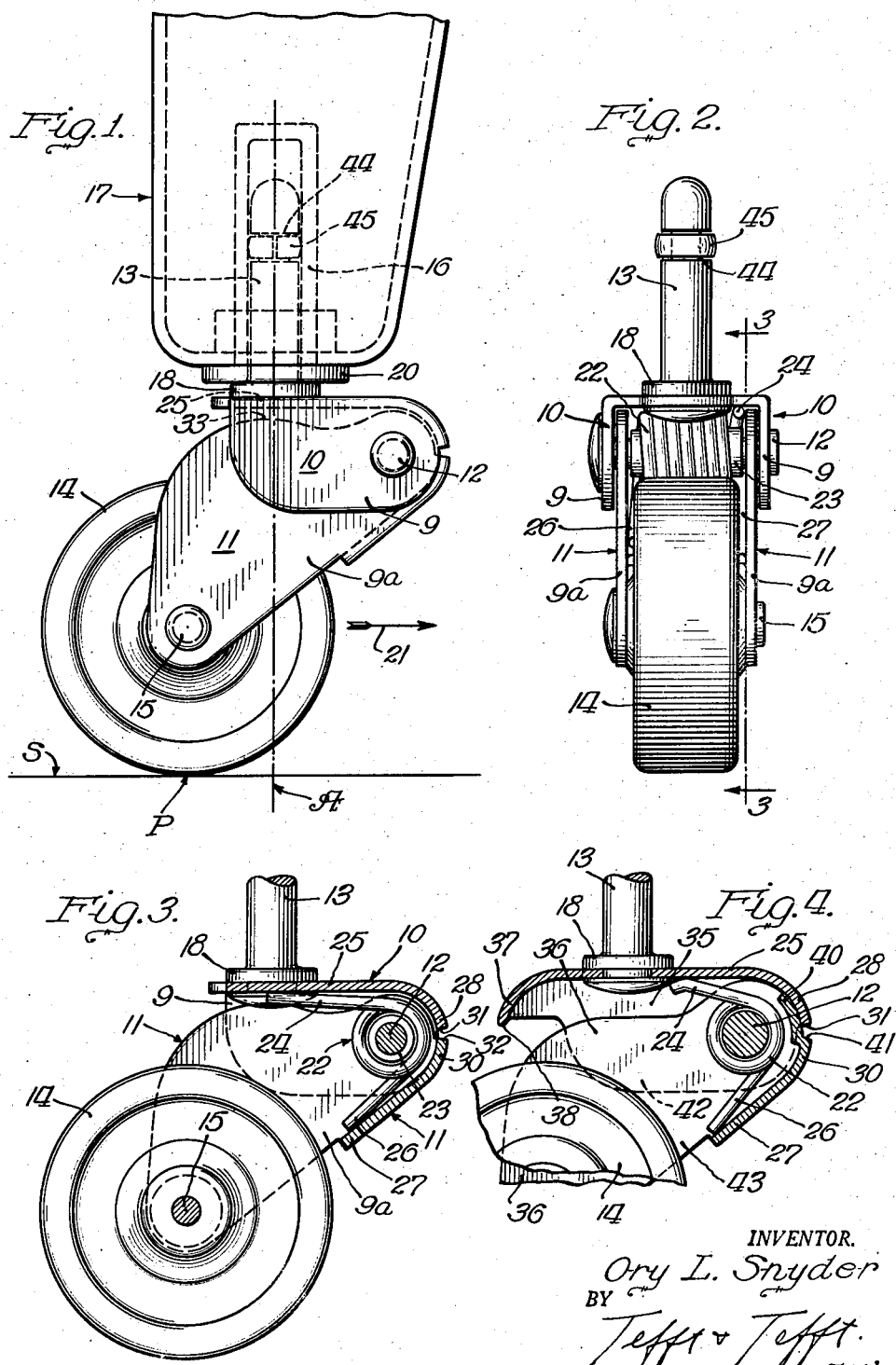
INVENTOR.
Ory L. Snyder
BY Tefft & Tefft.
Attys.

Patented June 7, 1949

2,472,686

UNITED STATES PATENT OFFICE 2,472,686

CASTER

Ory L. Snyder, Newark, N. Y., assignor of forty-nine per cent to The Dexter Company, Fairfield, Iowa, a corporation of Iowa Application November 17, 1943, Serial No. 510,633

6 Claims. (Cl. 16—44)

This invention relates to a caster for use on multi-legged devices such as manually movable machines or the like. The caster may be used for pieces of furniture equally well, but for purposes of illustration the same will be described as used on a leg of a washing machine.

Casters are in constant use on the legs of heavier devices such as washing machines, but due to the strains to which such are subjected when the machines are moved from place to place, the stems of such casters become warped or bent. The result is that the same tighten in their respective sockets and interfere with the free caster of the wheel and consequently the actual usefulness and efficiency of the caster is entirely lost. Obviously, due to the frictional interference with the natural castering of the wheel, the stem is then further subjected to lateral stresses that may eventually cause the stem to rupture entirely.

One of the main objects of the present invention is to provide a caster that will maintain its efficiency under constant use and which will eliminate the above stated disadvantages inherent in the ordinary forms of casters.

Another object of the caster herein disclosed is the ability of the caster to be self-leveling when the same is moved over irregular surfaces. While the usual designs of washing machines are equipped with three legs and the caster is equally applicable thereto, the same may well be used in a machine having four or more legs since the caster will at all times seek contact with the supporting surface regardless of the irregularities of such floor with respect to the multiple legs of the machine, such caster also at all times providing adequate suport for its share of the weight burden of the entire machine.

The caster of the present construction also has the ability of cushioning sudden jars or lateral stresses to ease the transmission of shock upon the caster stem, thereby protecting the same against bending or warping under various conditions of use. When casters of the present embodiment are employed to support testing equipment or other delicate instruments, the shocks to the legs are reduced and consequently are not transmitted in full force to the supported equipment.

A further object of the caster is to so construct the same as to house the resilient means in a manner to protect the same from foreign objects or damage by contact while such caster is in motion. In this connection the caster is also made to shed and divert water or other fluids that may be used in connection with the supported devices and to thereby keep such fluids away from the resilient means as much as possible.

All other objects and advantages of the caster of the present design shall be hereinafter described in conjunction with a more detailed explanation of the use and operation of such caster, having reference to the accompanying drawings which exemplify a preferred embodiment thereof.

In the drawings:

Fig. 1 is a side elevational view of a preferred form of caster as used and applied to the end of a leg of a washing machine;

Fig. 2 is an end elevational view of the same as seen from the left side of the caster in Fig. 1;

Fig. 3 is a vertical sectional view of the caster taken substantially along the line 3—3 in Fig. 2; and Fig. 4 is a fragmentary view analogous to Fig. 3, but showing a modified construction of caster.

The caster body consists of a pair of brackets 10 and 11 pivotally connected by a horizontally disposed pin 12. Bracket 10 supports the stem 13 while bracket 11 is pivotally connected with the wheel 14 by means of the pin 15. The pin 15 is preferably disposed substantially parallel to the bracket connecting pin 12.

As best seen in Fig. 1, the stem 13 of the caster is socketed in a suitable adapter 16 secured to the bottom end of the leg 17 of a washing machine or the like. An annular shoulder or ring 18 on the stem 13 and adjacent the bracket 10 forms a bearing surface upon which a portion of the leg 17 or as in this case the exposed flange 20 of the adapter 16 may seat to provide free pivotal movement of the caster relative to the leg about a vertical axis coincident with the axis of stem 13.

The usual caster effect is obtained by the offset of the wheel 14 which touches or rests upon a surface S at a point P suitably offset from the axis A of the stem 13. When the leg 17 is caused to move in the direction of the arrow 21 in Fig. 1, the wheel 14 and the brackets 10 and 11 will all swing into the vertical plane relationship shown, the plane being coincident with the line of movement. As the direction of travel of the leg 17 changes, the plane of the caster will follow the same and the pins 12 and 15 will always be generally disposed horizontally and at right angles to the plane of motion.

A suitable torsion spring 22 is carried upon the pin 12 and a sleeve 23, see Fig. 3, may be used as a positioning means to hold the spring with its coil axis substantially parallel to the axis of pin 12. The diameter of pin 12 could be made larger to eliminate the use of a sleeve 23 or the spring coil diameter might be decreased. The free ends of the spring 22 react against the insides of the lateral portions of the brackets 10 and 11, one end 24 bearing against the inside of the top 25 of bracket 10, while the other end 26 bears against the inner side of the rear cross portion 27 of the bracket 11.

The two brackets 10 and 11 provide cooperating protective members which together guard the torsion spring 22 against damage by contact and likewise prevent foreign articles from affecting the operation of the spring. Also, as best seen in Fig. 3, the skirt 28 at the rear of bracket 10 and the upturned end 30 of the bracket 11 coact to complete the closure or housing of the spring within this section of the caster. Shoulders 31 and 32 provided on the skirt 28 and end 30 normally come together in abutting relation to limit the movement of the two brackets relatively to each other about the pin 12 under the unwinding action of spring 22. In the drawings the shoulders 31 and 32 are parted and shown with the spring 22 loaded and supporting its allocate portion of the weight of the device of which the leg 17 forms a part.

As best illustrated in Figs. 2 and 3 it will be seen that the vertical sides 9 of bracket 10 and the top connecting portion 25 together with the vertical sides 9a of bracket 11, and the portion 27 connecting the latter two sides 9a form the protective enclosure of the resilient means comprising the torsion spring 22 and pivot pin 12. With the vertical sides 9 of bracket 10 straddling the vertical sides 9a of bracket 11 and by means of the skirt 28 and upturned end 30, the spring 22 and pin 12 are also well protected from water or other fluids that may drip or drain from the device supported by the caster.

Through the proper selection of spring, each caster will be able to support its portion of the load as carried through leg 17, and the wheel 14 can easily flex its way over irregularities in or upon the surface S by swinging about the pivotal axis of pin 12 located forwardly or in the direction of travel and ahead of axis A, the wheel 14 trailing such axis as shown in Fig. 1. The load will be spring supported and shocks imparted to the wheel will be cushioned by the spring and absorbed thereby to prevent transmission of such shocks directly to the swivel stem 13 of the caster. Therefore, vertical shocks and shocks in the direction of travel and laterally to the pin 13 are taken up by the spring 22.

Excessive abnormal shocks or possible overloads on the caster can be limited if desired in the amount of relative movement the brackets are capable of. This relative movement of the brackets is stopped when the high points 33 of the brackets meet the underside of the top 25 of the bracket 10 as best shown in Fig. 1. When this condition should occur, most of the shock or load will by that time be practically all absorbed by the spring, and for most normal conditions the brackets will be free to flex the spring by the proper selection of the latter. Experiment will best determine the size of spring for different applications and by using more or less turns of spring wire or using different sizes of spring wire the selection of springs can be unlimited to suit each particular installation.

Attention is also directed to the fact that while the actual caster offset is the distance between axis A and the axis of pin 15, the effectual arm which acts to tension the torsional spring 22 is the distance between the two parallel pin axes of pins 12 and 15 which are disposed on opposite sides of the axis A, the shocks or variations in tension being transmitted through wheel 14 to such effectual arm.

A modified construction of caster is illustrated in Fig. 4 which substantially follows the preferred construction but the brackets 10 and 11 have been somewhat changed with the thought of definitely sealing the spring chamber against ingress of water or other fluids which might impair the efficient and continuous operation of the spring 22. In Fig. 4 the brackets are designated as 35 and 36. Bracket 35 has a canopy 37 extending away from spring 22 and overhanging the sides of the wheel bracket 36 as shown in Fig. 4. The end of the canopy 37 terminates in a lip 38 to form a drip means for causing water droplets to drain free of the bracket 35 and at a point remote from spring 22.

A further liquid seal is effected by having the upcurved end 39 on bracket 36 continued as a wall 40 disposed concentric with the axis of pin 12 and substantially in contact with the inner under concentric surface of the skirt 28 that depends from the top 25 of bracket 35. The offset shoulder 41 in this case cooperates with the end 31 of skirt 28 to limit relative movement of the two brackets 35 and 36 when the caster is not in place or in unloaded condition. The depending sides 42 of bracket 35 straddle the sides 43 of bracket 36 so as to overhang the latter as indicated in Fig. 4 and in the same manner as portrayed in Fig. 2.

With this construction of caster as in Fig. 4, all liquids are shed or diverted away from the horizontal pivot pin 12 and the resilient means carried thereon to provide a caster having the attributes described and one that will have a long period of use with efficient operation to carry out the objects and advantages of the present invention. Wall 27 will shield the resilient means from splashing off of the floor.

It is to be noted that the overlapping sides 42 and 43 of the brackets 35 and 36 cooperate to relieve pin 12 from bending stresses when the wheel is moved over relatively rough surfaces. The overlapping of the sides therefore helps to stabilize the entire caster unit, and in the preferred form the sides 9 of bracket 10 and sides 9a of bracket 11 coact in the same manner. The clearances between the sides referred to may be made to suit various conditions of operation to any desirable amount. In Fig. 4, further stabilization is attained through the overlapping walls 28 and 40 that form the moisture seal at this point between the relatively movable brackets.

The caster, therefore, of either construction is a self-contained unit adapted for holding a load in floating relation to the surface, and no change is necessary in the adapters or other means hereinbefore employed in the legs of devices for the reception of casters. Shocks are cushioned and prevented from being transmitted directly to the swivel stems of the caster and also to the stem adapters whereby very efficient continuous operation results. Furthermore, all flexing takes place in the plane of motion and about a horizontally disposed axis which is maintained substantially at right angles to the plane of movement of the caster for all practical considerations.

Since no change is needed in the caster receiving adapters, the stem 13 of the caster shown is provided with a groove 44 for the reception of an expandible split ring 45 that engages the inner surface of the stem receiving adapter hole to prevent the caster from being displaced, and in this case to hold the bracket 10 in operative relation at all times with the ring 18 abutting the face of the flange 20 of the adapter 16.

It is to be understood that changes and modifications are anticipated without departure from the fundamental concept of the embodiment disclosed and described, and that the same shall not be limited to the exact form, construction, combination of parts, and for the uses herein set forth excepting as shall be determined by the breadth and scope of the appended claims.

I claim:

1. A caster comprising a first bracket, a stem fixedly secured to said bracket, second bracket, a wheel pivotally connected with said second bracket, a lateral pivot member connecting said brackets to permit relative movement therebetween under action of the supported load, and a spring member carried by said pivot member to engage the brackets respectively and adapted to support the normal maximum weight of the supported unit upon said caster and to hold said unit in resilient suspension, said stem bracket having depending sides to straddle and overlap the sides of said wheel bracket, said brackets having overlapping end walls adjacent said members, said sides and walls forming a chamber to confine said members therein and to protect the same from damage and to divert moisture away therefrom, said stem bracket also having an overhanging canopy to drain moisture from said bracket at a point remote from said members.

2. In a caster, the combination of a bracket having a stem rigidly connected therewith, a second bracket having a caster wheel, horizontally disposed pivotal means connecting said brackets for relative movement in a vertical direction, spring means carried by said pivotal means and coacting between said brackets to normally carry the maximum supported load, and cooperative shielding means connected with said relatively movable brackets respectively to house and protect the spring and pivotal means from draining water or foreign objects, said shielding means comprising vertically disposed side walls, and end walls connected between the side walls of each bracket to brace said side walls and to form a closure adjacent the aforesaid pivotal and spring means.

3. In a caster, the combination of a bracket having a stem rigidly connected therewith, a second bracket having a pivotally connected wheel, horizontally disposed pivotal means connecting said brackets for relative movement in a vertical plane, spring means carried by said pivotal means and coacting between said brackets to normally carry the maximum supported load, and cooperative shielding means connected with said relatively movable brackets respectively to house and protect the spring and pivotal means from draining water or foreign objects, said shielding means comprising vertically disposed side walls, and end walls connected between the side walls of each bracket and disposed in overlapping relationship concentrically with respect to the pivotal means for said brackets.

4. In a caster, the combination of a stem bracket and a wheel bracket, pivotal means connecting said brackets for relative movement, spring means carried by said pivotal means and coacting between said brackets to normally carry the supported load, and cooperative shielding means connected with said brackets to house and protect the spring and pivotal means from draining water or foreign objects, said shielding means comprising vertically disposed side walls, and end walls connected between the side walls of each bracket to brace said side walls and to form a closure adjacent the aforesaid pivotal and spring means, said side walls having portions thereof coacting to limit relative movement between said brackets in one direction; and said end walls having portions thereof coacting to limit relative movement between said brackets in the opposite direction.

5. A caster comprising a first bracket, a stem fixedly secured to said bracket, a second bracket, a wheel pivotally connected with said second bracket, a horizontal pivot member connecting said brackets to permit relative movement therebetween in a vertical direction, a spring member carried by said pivot member to engage the brackets respectively and to carry the maximum vertically imposed caster load in resilient suspension, said brackets having cooperating walls forming a shielded chamber to confine said spring member therein to protect the same from damage and to divert liquids away therefrom, parts of said cooperating walls being concentric with said pivot member and having means coacting to protect said pivot member and spring member while permitting relative movement of said brackets about said pivot member.

6. In a caster, a supporting member, a channel-shaped bracket having a curvature at one end secured to said supporting member, a second bracket having a channel-shaped portion fitting within the channel of the first bracket, a horizontal pivot connecting said brackets, said second bracket having a curved portion and a shoulder coacting with the curved end of the first bracket, a coil spring surrounding said pivot and having one end bearing against the first bracket and the other end bearing against the other bracket, said brackets forming a substantially concealed housing for said spring and a castor wheel journalled in said second bracket, said coil spring serving as a yielding support for the caster load.

ORY L. SNYDER.

REFERENCES CITED

The following references are of record in the file of this patent:

UNITED STATES PATENTS

| Number | Name | Date |
| --- | --- | --- |
| 408,595 | Dion | Aug. 6, 1889 |
| 1,745,992 | Herold | Feb. 4, 1930 |
| 1,834,617 | Harpine et al. | Dec. 1, 1931 |
| 2,051,627 | Weinmann | Aug. 18, 1936 |
| 2,320,407 | Campbell | June 1, 1943 |

FOREIGN PATENTS

| Number | Country | Date |
| --- | --- | --- |
| 434,161 | Great Britain | Aug. 27, 1935 |